Figure 1:
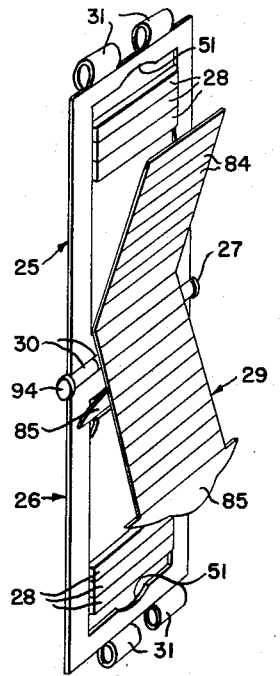

Sept. 20, 1960     H. L. DIAMOND     2,953,397
POCKET SECRETARY

Filed April 14, 1958     3 Sheets-Sheet 1

INVENTOR.
Harry L. Diamond
BY
*L. S. Saulsbury*
ATTORNEY

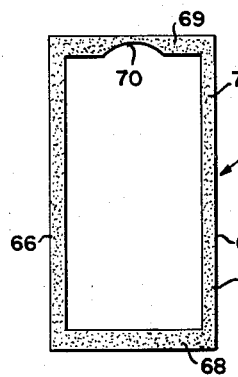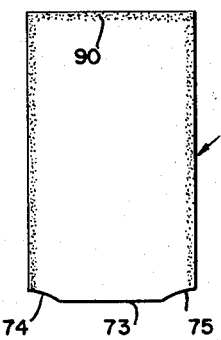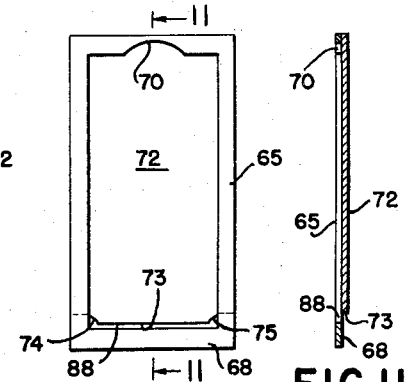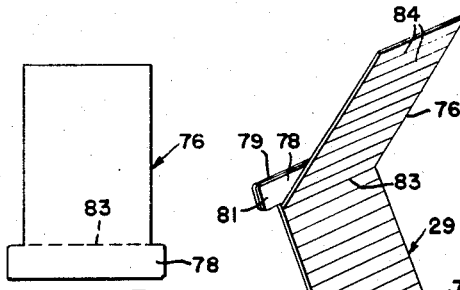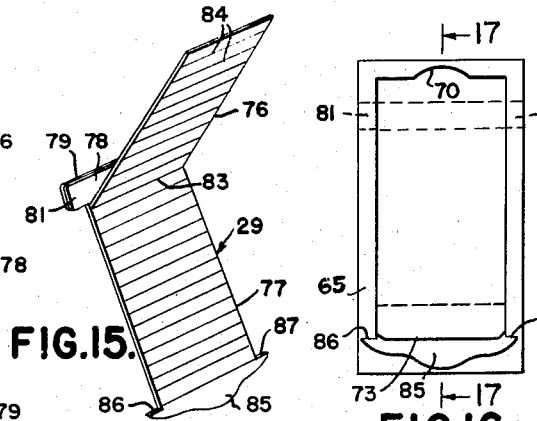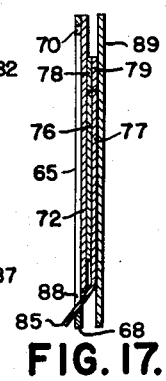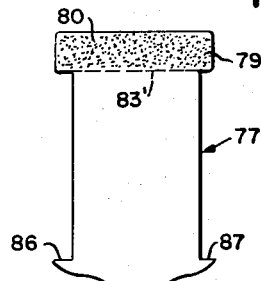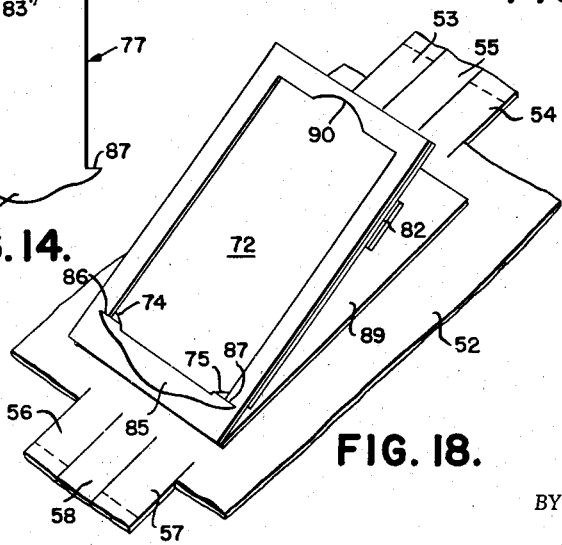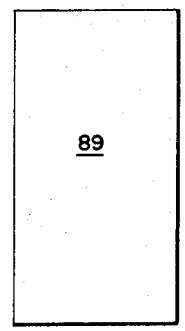

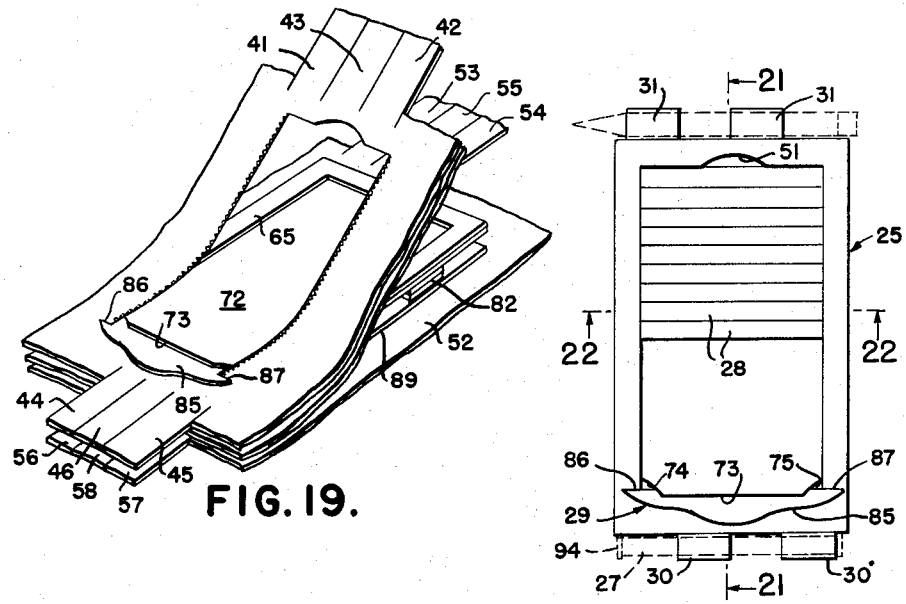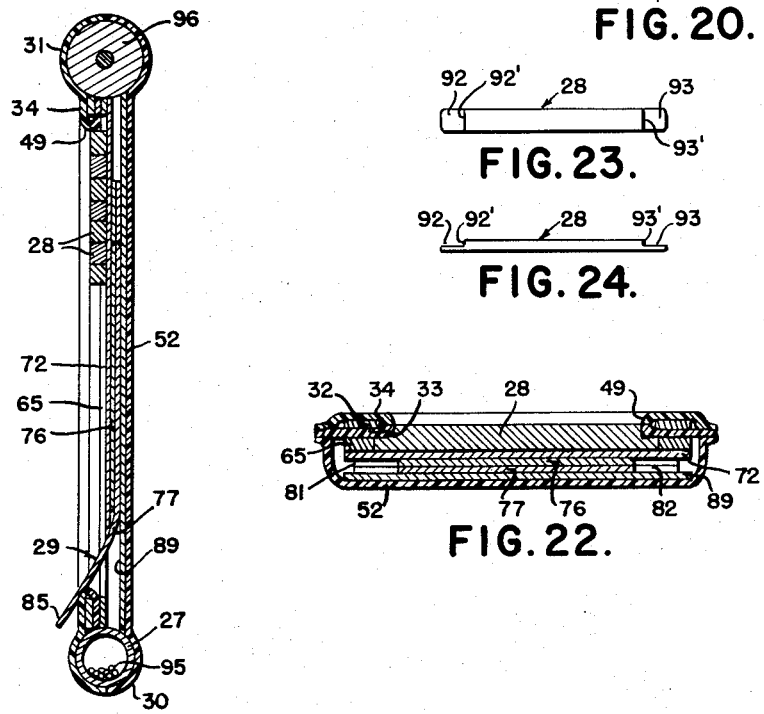

United States Patent Office 2,953,397
Patented Sept. 20, 1960

2,953,397

POCKET SECRETARY

Harry L. Diamond, Hotel Newburgh, Newburgh, N.Y.

Filed Apr. 14, 1958, Ser. No. 728,393

1 Claim. (Cl. 281—15)

This invention relates to a pocket secretary.

The principal object of this invention is to provide a pocket secretary which can be easily carried in the coat pocket or handbag and the accumulated data, memorandum and reminder material made quickly and easily available when removed from the pocket or handbag and once in the hand.

It is another object of the invention to provide in a pocket size secretary a progressive reminder of things to be accomplished, important appointments, dates, due dates of bills, meetings, on removable and slidable elements that may be chronologically and timely arranged and rearranged on guideways on the interior thereof and wherein these elements are adapted to receive pencil markings and at the same time permit the easy removal of these markings therefrom.

It is still another object of the invention to provide a pocket secretary which will have for additional data, memoranda and the like a slidable booklet embodied in the hinged parts and adapted to be pulled therefrom by grasping a tab accessible on the inner face of the secretary parts and which can be opened once it has been pulled and supported upon the interior surfaces of the secretary when it is desired to write upon the same, and which can be reinserted between its guide pieces of its compartment and concealed therein until such time as the data contained thereon is again needed.

It is a further object of the invention to provide a pocket secretary which will be made and assembled from complementary, identical and interchangeable parts joined together by hinge loops supplied on the parts and a hinge pin extending therethrough and wherein the hinge pin is in the form of a sleeve that may serve for the storage of pencil leads.

It is a still further object of the invention to provide a pocket secretary formed of hinged parts which can be held closed upon one another by a removable pencil extended through loops on the free ends of the parts so as to hold the parts closed and to provide a complete and compact kit.

It is a still further object of the invention to provide a pocket secretary in which the parts can be formed from paper or Celluloid filler members or guide pieces and plastic covering sheets and assembled by simple gluing and plastic die heating sealing operations.

Other objects of the invention are to provide a pocket secretary having the above objects in mind, which is of simple construction, formed of a minimum number of parts, easy to assemble, adaptable for parts formed either of paper, plastic, metal, leather or silk, or any other suitable material, inexpensive, requires only simple labor operations, compact, light in weight, durable, efficient and effective in use.

Figure 2:
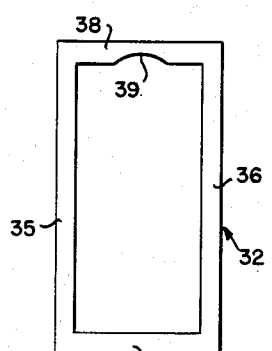
Figure 3:
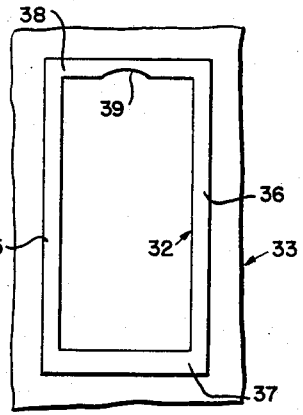
Figure 1A:
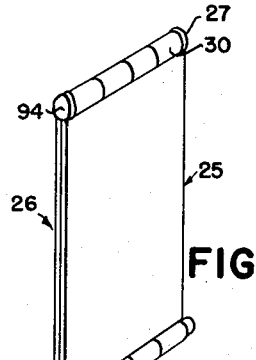
Figure 4:
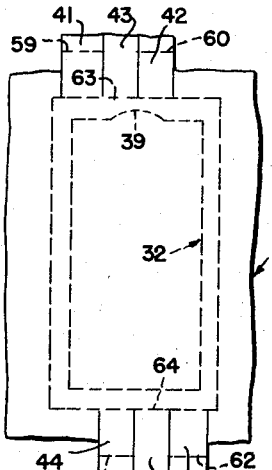
Figure 7:
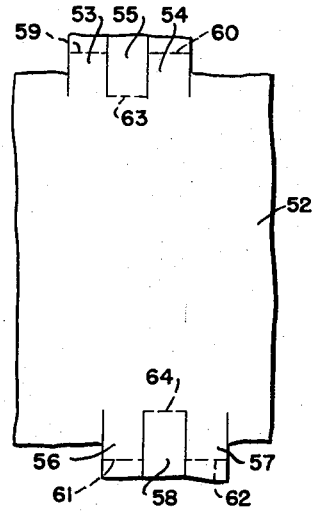
Figure 6:
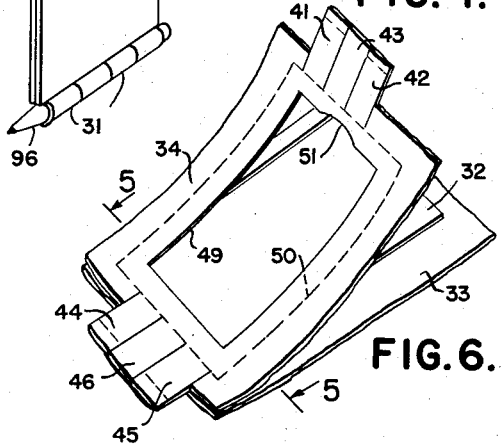
Figure 5:
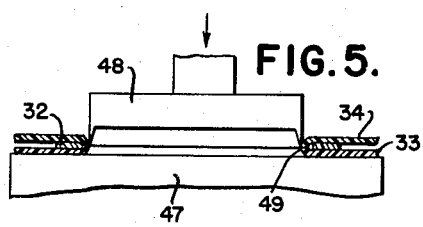

For a better understanding of the invention, reference may be had to the following detailed description taken in connection with the accompanying drawing, in which Figure 1 is a perspective view of a pocket secretary, embodying features of the present invention and with the parts opened, Fig. 1a is a perspective view of the pocket secretary with the parts closed, Fig. 2 is a plan view of a frame filler piece, Fig. 3 is a plan view of a bottom plastic sheet for the frame filler, Fig. 4 is a plan view of a top plastic sheet with hinge and pencil loop projections overlying the pieces shown in Fig. 3, Fig. 5 is a sectional view taken on line 5—5 of Fig. 6 illustrating the manner in which the sealing of the interior of the top assembly shown in Figs. 2, 3 and 4 is effected with a heat treating tool, Fig. 6 is a perspective view of the paper filler frame of Fig. 2 and the plastic sheets of Figs. 3 and 4 being assembled upon one another, Fig. 7 is a plan view of a third plastic sheet serving as the backing and covering for the entire assembly, Fig. 8 is a plan view of data element guide frame, Fig. 9 is a plan view of an internal booklet guiding sheet, Fig. 10 is a plan view of the frame of Fig. 8 and the backing sheet of Fig. 9 adhered to one another, Fig. 11 is a longitudinal sectional view of the same taken on line 11—11 of Fig. 10, Fig. 12 is a plan view of a back booklet guide piece, Figs. 13 and 14 are plan views of booklet parts, Fig. 15 is a perspective view of the slide booklet formed of the parts shown in Figs. 13 and 14 assembled and adhered one to another, Fig. 16 is a plan view of the booklet, booklet guiding parts, and the data element guide frame assembled upon one another, Fig. 17 is a longitudinal sectional view of the booklet assembly shown in Fig. 16 taken on line 17—17 thereof, Fig. 18 is a perspective view of the booklet assembly shown in Figs. 16 and 17 assembled upon the back covering plastic sheet shown in Fig. 7, Fig. 19 is a perspective view of the heat sealed frame assembly shown in Fig. 6 being assembled upon the booklet assembly shown in Fig. 18 preparatory to the final heat sealing operation, Fig. 20 is an inside plan view of one of the completely assembled parts of the secretary with illustration made of the pencil lead-retaining hinge pin and of the pencil used in locking the hinged parts together, Fig. 21 is an enlarged and exaggerated longitudinal sectional view taken on line 21—21 of Fig. 20, Fig. 22 is an enlarged and exaggerated transverse sectional view taken on line 22—22 of Fig. 20, and Figs. 23 and 24 are respectively top and side elevational views of the slidable and replaceable data memoranda and reminder elements.

Referring now particularly to Figures 1 and 1a, there is shown generally the memorandum and daily reminder pocket secretary that is formed of two complementary and identical parts 25 and 26 of the same construction and joined together by a hinge sleeve pin 27 with certain of the slidable reminder elements 28 in place and one of the booklets 29 pulled out of one of the parts. The parts as shown in Fig. 1a when closed upon one another are joined by extending an automatic pencil 30 through joined loops 31 of each of the parts.

In Figs. 2 to 7 inclusive, the first sub-assembly is made up of an internal filler frame 32, a bottom plastic sheet 33, and a top hinge plastic sheet 34. The filler frame 32 is formed of stiff paper or cardboard and has side portions 35 and 36 and bottom and upper connecting end portions 37 and 38. The end portions 38 are relieved at 39 to permit within the assembly the insertion of the fingers to grasp the data-containing or reminder elements 28.

This filler frame 32 is laid as shown in Fig. 3 upon the bottom plastic sheet 33. The top hinge plastic sheet 34 having loop portions 41 and 42 separated by a cut away portion 43, on the upper end of the sheet 34 and offset therefrom at the lower end of the sheet 34 are loop portions 44 and 45 separated by a cut away portion 46. This plastic sheet 34 is placed over the filler frame 32 and the bottom sheet 33 to provide thereby a three piece subassembly. This assembly is placed in a heat-sealing machine 47, Fig. 5 and a die 48 is pressed downwardly as illustrated therein to heat seal the plastic sheets internally of the filler frame 32 along the inner edge thereof and to provide for a window opening 49 internally of the assembly. The internal piece is easily afterwards torn away out of the opening. The exterior of the plastic sheets of the filler frame 32 are not sealed at this time. In Fig. 6, merely for illustrative purposes the plastic sheets are shown being assembled, with the dotted line 50 outlining the seal line and the filler frame 32 disposed therebetween. At the upper end of the recess 49 the plastic sheets are cut away at 51 and within the cut away 39 of the filler frame to permit the insertion of the finger to remove the reminder elements from the hinged part.

A third plastic cover sheet 52, Fig. 7, serves as a backing and has at its upper end complementary loop portions 53 and 54 with a cut away portion 55 therebetween and on its lower end complementary loop portions 56 and 57 with a cut away portion 58 lying therebetween. These loop portions 53, 54 and 56, 57 will be united respectively with loop portions 41, 42 and 44, 45 of the top plastic sheet 34 as along dotted lines 59, 60, 61, 62 of the sheets whereas the cut away portions 43, 55 and 46, 58 will be united at their roots along lines 63 and 64 of these cut away portions so that the cut away portions will be relieved and thrown away. The joined loop portions will provide the hinge and pencil loops 30 and 31.

Referring now particularly to Figs. 8 to 11, there is shown another assembly made up of a reminder element guide frame 65 having sides 66 and 67 and bottom and top portions 68 and 69. The top portion 69 has a cut away finger inserting edge 70. One side of this frame 65 is provided with an adhesive 71 by which the frame 65 is secured to a front booklet guide piece 72, Fig. 9, of less length than the guide frame 65 and having a lower edge 73 lying internally of the end portion 68 of the guide frame 65 as best seen in Fig. 10 and having cut away side ends 74 and 75. The guide frame 65 has adhesive 75' on its underface to join the frame as shown in Fig. 10 with the upper face of the booklet guide piece 72. The adhesive along the portion 68 of the guide frame 65 is not needed for the joining of these two pieces.

The slide booklet assembly 29 is composed of an upper part 76 and a lower pull part 77. The upper part 76 has a wide inner portion 78 that is adhered to a wide portion 79 by adhesive 80 as shown in Fig. 15 to provide side stop projections 81 and 82 as shown in Figs. 15 and 16. The part 76 is scored along line 83 to permit the part 76 to be lifted in the manner best illustrated in Figs. 1 and 15 to provide access to writing spaces 84 on the inner side thereof. The lower part 77 of the booklet 29 has a pull tab portion 85 providing stop shoulders 86 and 87 that enter the recesses 74 and 75 of the top booklet guide piece 72 to limit the inward movement of the booklet under the guide piece 72. This pull tab portion 85 extends from a slot 88 provided between the inner edge of the frame portion 68 and the edge 73 of the upper booklet guide piece 72 as best seen in Figs. 10, and 16 to 18.

A back booklet guide piece 89 as shown in Fig. 12 is of the same external dimension as the reminder elements guide frame 65, Fig. 8. The booklet 29 is disposed between the front guide piece assembly shown in Figs. 10 and 11 and the back booklet guide piece 89 as seen in Fig. 17 and is united therewith by adhesive 90 on the front booklet guide piece 72 along the side and upper edges thereof and the remaining portion of the adhesive 75 on the portion 68 so as to join these pieces together. These pieces are formed of paper or Celluloid and provide a guideway assembly for the booklet 29, Figs. 16, 17 and 18 and with the reminder elements guide frame 65 forming a part thereof. With the booklet and guideway pieces therefor assembled, the next step is to place assembly upon the plastic covering sheet 52 shown in Fig. 7 and in the manner as illustrated in Fig. 18, the guideway pieces being separated from one another merely for illustration.

Upon the assembly shown in Fig. 18 is disposed the top frame assembly shown in Fig. 6 and in the manner illustrated in Fig. 19. With the parts so assembled a heat sealing die similar to the die shown in Fig. 5, is brought down over the exterior of the frames and of the hinge portions to make up the final assembly part. Three layers of the plastic are sealed to one another about the outer edges of the frame elements 36 and 65 and generally along dotted lines as best illustrated in Fig. 4. At the same time the hinge loops are joined to one another along the lines 59, 60 and 61, 62. The extraneous plastic material bordering these sealing lines is removed and the finished part, best shown in Fig. 20, will have been formed.

The data or reminder elements 28 are assembled under the cover frame piece assembly as best seen in Figs. 22, 23 and 24. Their ends 92, 93 are reduced in thickness so that they can easily slide under the top assembly with their inner ends abutting the inner edges of the side portions 66 and 67 of the guide frame 65 and their respective shoulders 92' and 93' abutting the sealed edges of the top frame opening 43. With these reduced ends and the shoulders these data elements can be guided in their movement within the part. These elements are made of washable plastic of sufficient roughness on their outer surface as to receive pencil marks. They are bendable and upon elevating them to the top of the part and by extending the finger through the recess 51 they can readily be lifted from the frame part.

With the parts finally formed, they may be assembled to one another by the sleeve hinge pin 27 which has a removable cap 94 that can be removed therefrom so that pencil leads 95 can be inserted into the sleeve and held therein by the cap 94. The parts 25 and 26 can thereby be hinged from one another in a notebook fashion and so that easy access is not only had to the removable data elements 28 but also to the booklet 29. When the parts are hinged together, the loops 31 of the parts will become aligned with one another and pencil 96 can be extended through them to lock the parts together. The pencil will thereby have a place where it can be retained and also serve a useful purpose of locking the parts together.

It should now be apparent that there has been provided a pocket secretary that is formed of identical parts, each of the parts having slidable data receiving or reminder elements and a booklet for any other identical data which may be needed to be received. These parts are joined together by a hinge sleeve pin extending through the loops formed during their assembly in which the hinge pin serves as a storage space for pencil leads. The parts are held together when closed upon one another by an automatic pen extended through the aligned loops 31.

While various changes may be made in the detailed construction, it shall be understood that such changes shall be within the spirit and scope of the present invention as defined by the appended claim.

What is claimed is:

A pocket secretary comprising a top assembly formed of cover sheets sealed about a frame to provide a top opening, one of said cover sheets having hinge projections upon the opposite ends thereof, a bottom assembly comprising a guide frame, backing members and a cover sheet having cooperating hinge projections connected to the projections of the cover sheet of the top assembly to provide loops and data elements slidable within the top opening and under the top assembly, said hinge projections being joined together to provide loops for receiving a hinge pin and other loops to receive a pencil, and a booklet pocket assembly connected beneath the guide frame and above the bottom cover sheet, said pocket assembly including a front pocket guide piece lying under the guide frame and extending to a point short of the inner side of one end of the guide frame to provide a slot therebetween, a booklet having pages hinged upon one another and at least one of the pages extending through the opening and having a pull tab portion thereon extending from the slot, said booklet having stop projections at the inner end thereof engageable with the sides of the pocket adjacent the opening to prevent the booklet from being pulled entirely from the slot.

References Cited in the file of this patent

UNITED STATES PATENTS

| | | |
|---|---|---|
| 1,407,239 | Weiss | Feb. 21, 1922 |
| 1,438,145 | Swartz | Dec. 5, 1922 |
| 2,531,606 | Broughton | Nov. 28, 1950 |
| 2,647,071 | Schade | July 28, 1953 |
| 2,696,992 | Duff | Dec. 14, 1954 |